US011771184B2

(12) United States Patent
Nevatia et al.

(10) Patent No.: US 11,771,184 B2
(45) Date of Patent: Oct. 3, 2023

(54) JEWELRY WITH NON-PRECIOUS METALLIC CORE AND PROCESS FOR PRODUCING

(71) Applicant: Sunjewels Private Limited, Mumbai (IN)

(72) Inventors: Neeraj Nevatia, Mumbai (IN); Anupam Mawandia, Mumbai (IN)

( * ) Notice: Subject to any disclaimer, the term of this patent is extended or adjusted under 35 U.S.C. 154(b) by 133 days.

(21) Appl. No.: 17/470,619

(22) Filed: Sep. 23, 2021

(65) Prior Publication Data

US 2022/0125166 A1 Apr. 28, 2022

(30) Foreign Application Priority Data

Oct. 28, 2020 (IN) .............................. 202021046928

(51) Int. Cl.
*B22D 25/02* (2006.01)
*A44C 5/02* (2006.01)
*A44C 27/00* (2006.01)
*B22C 9/22* (2006.01)
*B33Y 50/00* (2015.01)
*B22C 7/02* (2006.01)
*B33Y 80/00* (2015.01)

(52) U.S. Cl.
CPC .............. *A44C 5/022* (2013.01); *A44C 27/00* (2013.01); *B22C 7/02* (2013.01); *B22C 9/22* (2013.01); *B22D 25/026* (2013.01); *B33Y 50/00* (2014.12); *B33Y 80/00* (2014.12)

(58) Field of Classification Search
CPC .. B22C 7/02; B22C 9/04; B22C 9/043; B22C 9/10; B22C 9/108; B22C 9/22; B22D 25/026
See application file for complete search history.

(56) References Cited

U.S. PATENT DOCUMENTS 1,398,706 A 11/1921 Rust
2003/0209338 A1* 11/2003 Gefen ...................... A44C 9/00
164/76.1

* cited by examiner

*Primary Examiner* — Kevin P Kerns
*Assistant Examiner* — Steven S Ha
(74) *Attorney, Agent, or Firm* — Ifica D. Mehra

(57) ABSTRACT

Jewelry with non-precious metallic core and process for producing, comprising an outer layer (10) and an inner core (50), a melting temperature of the inner core (50) is higher than that of the outer layer (10), consequent to a synchronous position of an outer markers (12a, 12b, 12c) and an inner markers (52a, 52b, 52c), the outer layer (10) engulfs the inner core (50) with a prescribed thickness dimension (44) all around; mechanically moving, flexing and load bearing part of an active jewelry are made of non-precious metal, the outer layer (10) is made of a precious metal like gold, silver, platinum and the like; while the inner core (50) is made of a non-precious metal like steel, titanium and the like, the jewelry article (100) is studded with diamonds and precious stones. The jewelry article (100) may be an array of closed links (110).

11 Claims, 19 Drawing Sheets

15

JEWELRY WITH NON-PRECIOUS METALLIC CORE AND PROCESS FOR PRODUCING

FIELD OF THE INVENTION

The present invention relates to ornaments and jewelry. Particularly, the invention relates to ornaments and jewelry of precious metal having a non-precious metal core within, and process a of producing them.

BACKGROUND OF THE INVENTION

Jewelry manufacturing has the challenge of aesthetics and finish besides robustness and other manufacturing issues. The processes used are by and large same as those used for any metal work of intricate shape. Investment casting is one of the most common techniques deployed for jewelry manufacture in volumes. U.S. Pat. No. 1,398,706 describes this.

Jewelry products like Chains and continuous links need to be assembled by interlinking and joints are detrimental here again. Patent BG6606B1 describes such processes which involves several mechanical operations and skill.

Precious metals and consequently jewelry of precious metals is getting expensive exponentially.

There are known several attempts and disclosures to sustain rich and royal look and aesthetics of jewelry while reducing material cost. Some of the earliest attempts are to use precious metals of lesser purity.

Indian patent 273975 discloses a hollow jewelry. Such jewelry while saving significantly on precious metal does not give the same "feel" due to its lightness. Fixing of precious stones poses new challenges in hollow jewelry, if at all possible.

Hollow jewelry filled with wax and lac or such other soft material is well known. Such filled or unfilled hollow jewelry are mechanically weaker. Particularly, some parts of jewelry made in all-precious metal are not so robust as such parts if made in industrial metals like steel and steel alloys.

Jewelry and ornaments ought to have an external finish unparalleled by other metallic objects.

Present invention addresses the conflicting need effectively. Production of Jewelry which is solid as well as continuous has to meet all the challenges. Our inventiveness also lies in minimal mechanical operations leading to high quality jewelry with consistent finish.

OBJECTIVE OF INVENTION

The objective is to invent solid yet economic jewelry in the form of bracelets, bangles, necklaces rings, earring, pendant and chains and a process of producing such jewelry.

Another objective is to invent a process of producing solid jewelry free from joints and thus free from joining marks normally unavoidable in making chains or arrays of links.

Yet another objective is to invent a jewelry and manufacturing process thereof, wherein a balance between strength of industrial metals and ornamental appearance of jewelry are both achievable without compromise on either.

Yet another objective is to reduce cost of jewelry without reducing strength, features and functionalities.

Yet another objective is to reduce cost of jewelry without compromising external durability and ornamental value.

Yet another objective is to be able to objectively reclaim a material value of the precious metal.

SUMMARY OF INVENTION

The present invention is a dual metal jewelry and a process to make such jewelry of precious metals having a core of non-precious material, preferably a metal or a metal alloy, within, wherein a jewelry article has an outer layer of a precious metal like gold, silver, platinum and the like, while an inner core is of a different metal or metallic alloy. A melting temperature of the inner core is higher than that of the outer layer. A CAD model of an outer object is developed which dimensionally corresponds to the outer layer, and another CAD model of an inner object is developed, which dimensionally corresponds to the inner core.

The outer object has a plurality of outer markers and the inner object has a corresponding plurality of inner markers. Each inner marker is identical in dimension and orientation to corresponding outer markers respectively. The outer markers as well as the inner markers are identically located with respect to a common reference coordinate.

In an assembly mode of the CAD modelling, when the outer object and the inner object are "virtually" assembled, as is well known, such that the inner markers and the outer markers are made to exactly overlap, such a position is defined, for the present invention, as a synchronous position, In the synchronous position the outer object engulfs the inner object with a prescribed thickness dimension all around. This prescribed thickness dimension is uniform or non-uniform as desired by CAD modeler.

The thickness dimension of the outer object is carefully and prudently decided based on precious metal selected and features/strength required. Hence a thickness dimension of a silver jewelry may be higher than an identical jewelry made in gold. Whether or not precious stones are studded, and their size is also an important factor deciding the thickness dimension.

A master outer object corresponding to an outer object, and a master inner object corresponding to an inner object is produced firstly in wax/equivalent material by 3D printing, and then in a durable metal by a casting process. To make the master outer object and the master inner object suitable for preparing molds for production, a runner is non-removably attached to each, to get an outer master and an inner master.

For producing the jewelry article, an outer object mold and an inner object mold is prepared, using the outer master and the inner master respectively, as a pattern. These molds are made of a material depending on production quantity of the jewelry article. For the present embodiment the outer object mold and inner object mold is considered to be made of synthetic rubber of durometer hardness 40 to 70. However, such molds are made also in metal of different mechanical properties.

To produce the jewelry article, an inner wax master is made by filling in wax in the inner object mold. The inner wax master is then converted into an inner pre-core by the casting process. A runner of the inner pre-core is then trimmed, and an inner core thus obtained is then placed in the outer object mold, such that the plurality of inner markers occupies the synchronous marker position created in the outer object mold by the outer markers of the outer master. The outer object mold is then filled with wax to obtain a jewelry pre-article. The jewelry pre-article is then converted into an unfinished article wherein the outer wax is replaced by precious metal using the casting process, so as to form the outer layer. Such unfinished article has a runner made of precious metal, which is removed. A plurality of inner markers made of non-precious metal and still projecting out are removed to obtain the jewelry article as per present invention. Consequent to the synchronous position, the outer layer engulfs the inner core with a prescribed thickness dimension all around.

For producing the jewelry article in bulk, a plurality of jewelry pre-article is grouped together around a pillar which is erected in a rigid base.

Jewelry articles of non-symmetrical shapes and contours, open ends and of any complex shape and contour are producible by the present invention with equal ease.

Jewelry articles producible by the present inventive process can be studded with diamonds and precious stones, by pushing them in wax/equivalent material of the jewelry pre-article.

An array of links can be made using any shape of closed links. Each link is held by a separate support during the casting process.

Importantly, mechanically moving, flexing and load bearing part of an active jewelry are optionally made of non-precious metal as per present invention, giving a longer durability to such jewelry. A bracelet made as per present invention has a hinge and a locking clasp integrally made of the non-precious metal of the inner core.

A preferred embodiment of the casting process referred to above is as follows: A wax formation of the jewelry or object to be cased is installed in a casting flask of metal with big holes all around. The holes are initially temporarily closed by wrapping a thin plastic film coated with adhesive so as to keep the plastic film in its place. The casting flask is filled with gypsum plaster, also known as plaster of Paris, lime plaster, or cement plaster or equivalent material which has refractory properties i.e. it should be able to withstand up to 1000° C. temperature without scorching or burning away and should not produce fumes when heated. The refractory material is filled in low viscosity form by making its dilute solution in water such that it can completely fill in the hollow part of every link through openings provided. After the refractory material solidifies, the casting flask is heated so as to melt away the wax or the equivalent material used for making solid model. Precious metal in the molten form is poured in the casting flask and plurality of jewelry is obtained, with diamonds and precious stones studded robustly.

DETAILED DESCRIPTION OF INVENTION

The preferred embodiment of jewelry as per our invention and process thereof is now being described with the help of drawings. It is to be noted that virtually unlimited number of shapes can be created using the concept of this product and process invention and therefore no shape and material described here is to be misconstrued as limiting this process invention.

Figure 1:
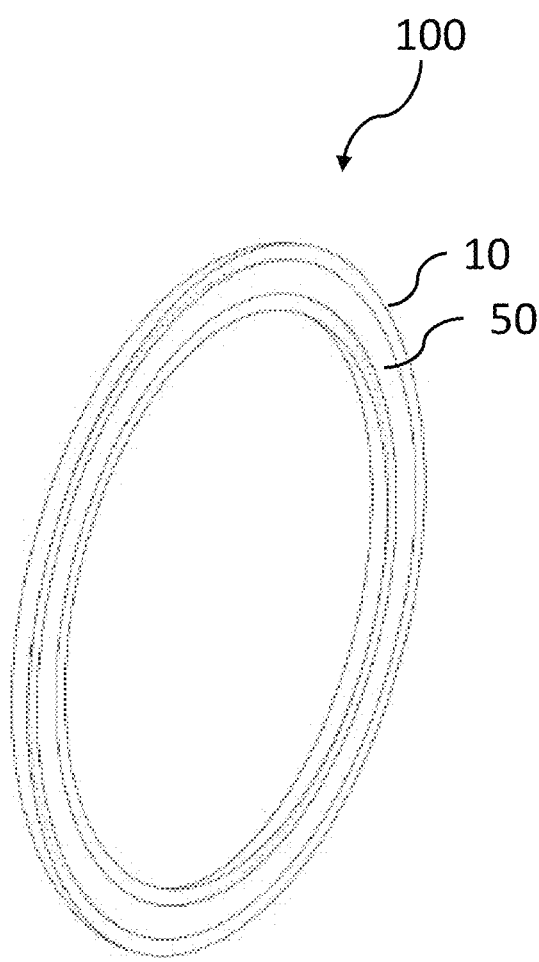
FIG. 1 is a sectional perspective view of a jewelry article as per present invention.
Figure 2:
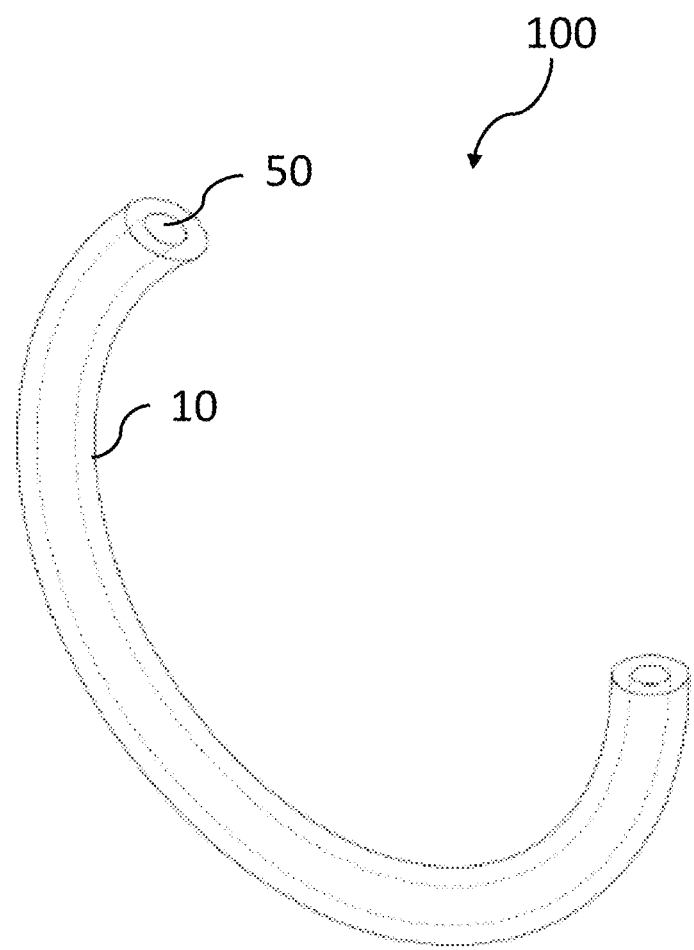
FIG. 2 is another sectional perspective view of the jewelry article as per present invention.

The present invention describes a dual metal jewelry and a process to make such a jewelry of precious metals having a core of non-precious material, preferably a metal or a metal alloy, within. FIG. 1, 2 is a sectional view of an embodiment, wherein a jewelry article (100) has an outer layer (10) of a precious metal like gold, silver, platinum and the like, while an inner core (50) is of a different metal or metallic alloy. A melting temperature of the inner core (50) is higher than that of the outer layer (10).

Figure 3:
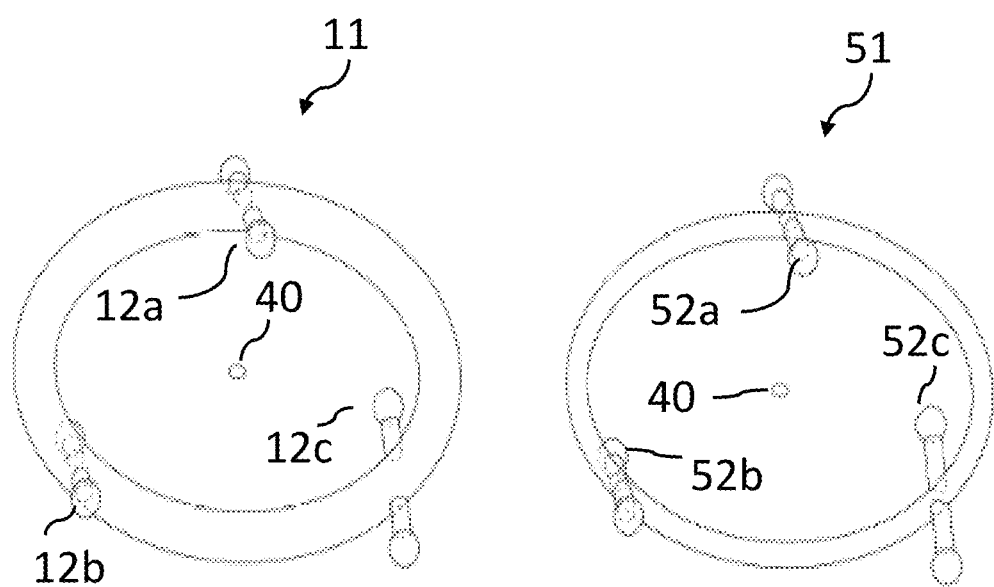
FIG. 3 is a perspective view of an outer object and an inner object.

FIG. 3, a CAD model of an outer object (11) is developed which dimensionally corresponds to the outer layer (10), and another CAD model of an inner object (51) is developed, which dimensionally corresponds to the inner core (50).

The outer object (11) has a plurality of outer markers (12a, 12b and 12c). All markers may be identical and symmetrically located on the outer object (11). As a variation, the outer markers (12a, 12b, 12c) may be dimensionally different from one another and asymmetrically located.

The inner object (51) has a plurality of inner markers (52a, 52b and 52c). Each inner marker is identical in dimension and orientation to corresponding outer markers (12a, 12b, 12c) respectively. More specifically, the inner markers (52a, 52b, 52c) and the outer markers (12a, 12b, 12c) are constructed to form marker pairs (52a, 12a), (52b, 12b), (52c, 12c) and so on, such that the inner markers and the outer markers can completely overlap only in one situation. The inner markers (52a, 52b, 52c) are located on the inner object (51) such that the outer markers as well as the inner markers are identically located with respect to a common reference coordinate (40). For the preset embodiment, which is circular, the reference coordinate (40) may be a center of the inner object (51), which is also the center of the outer object (11).

The inner markers (52a, 52b, 52c) and which are identical to the outer markers (12a, 12b, 12c) are such differently shaped and oriented that they completely overlap only in one situation.

Figure 4:
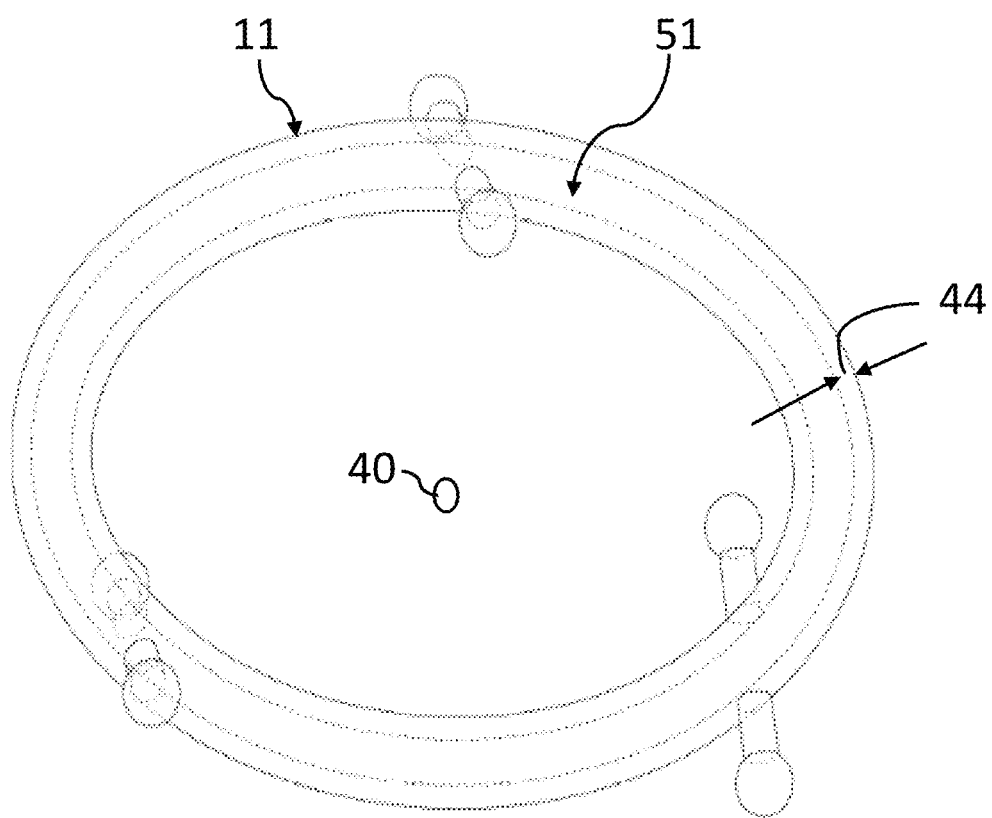
FIG. 4 is a perspective view of a virtually assembled CAD model of the outer object and the inner object.

FIG. 4, in an assembly mode of the CAD modelling, when the outer object (11) and the inner object (51) are "virtually" assembled, as is well known, such that the inner markers (52a, 52b, 52c) and the outer markers (12a, 12b, 12c) are made to exactly overlap, such a position is defined, for the present invention, as a synchronous position, In the synchronous position the outer object (11) engulfs the inner object (51) with a prescribed thickness dimension (44) all around. This prescribed thickness dimension (44) is uniform or non-uniform as desired by CAD modeler.

The thickness dimension (44) of the outer object (11) is carefully and prudently decided based on precious metal selected and features/strength required. Hence a thickness dimension (44) of a silver jewelry may be higher than an identical jewelry made in gold. Whether or not precious stones are studded, and their size is also an important factor deciding the thickness dimension (44).

Available CAD systems are capable of producing output in different forms like print binary or drawing exchange format (DXF) or stereo lithographic format (STL). STL format is the format usable as an input to three-dimensional (3D) printing machines. There are several such design systems available, Rhino, ProE, CATIA, AutoCAD, Solidworks etc. are just to cite few.

3D printing machines are known to "print" i.e., produce the CAD model using materials which have low melting point—like wax, polyethylene, Acrylonitrile butadiene styrene (ABS). Our inventive process also requires low surface hardness and therefore physical solid model is obtained by inputting wax or equivalent material.

Figure 5:
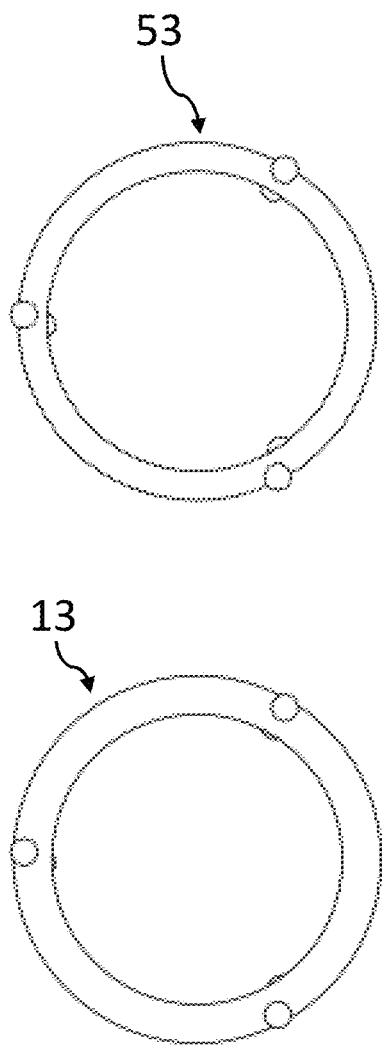
FIG. 5 is a front view of a master outer object and a master inner object.
Figure 6:
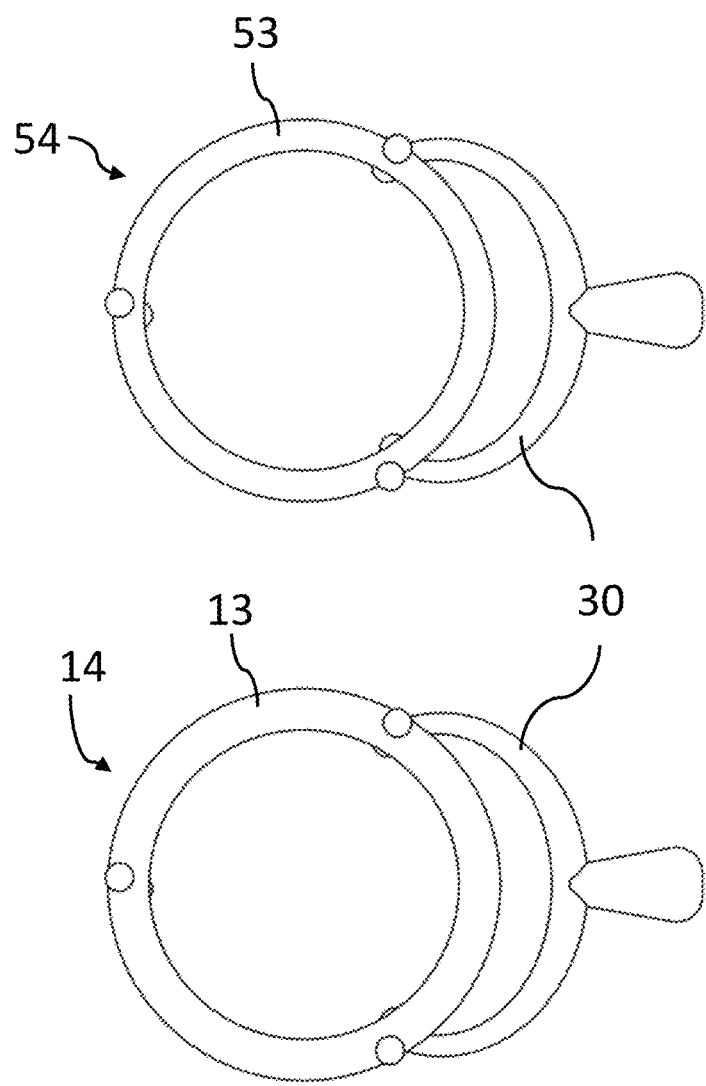
FIG. 6 is a front view of an outer master and an inner master.

FIGS. 5, 6, a master outer object (13) corresponding to an outer object (11), and a master inner object (53) corresponding to an inner object (51) is produced firstly in wax/equivalent material by 3D printing, and then in a durable metal by a casting process. To make the master outer object (13) and the master inner object (53) suitable for preparing molds for production, a runner (30) is non-removably attached to each, to get an outer master (14) and an inner master (54).

Figure 7:
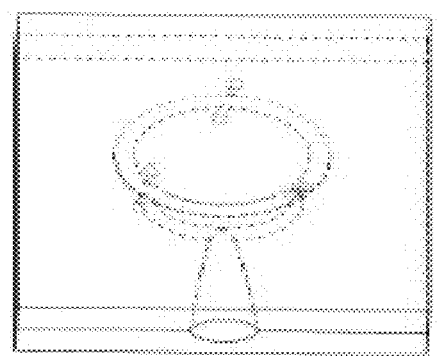
FIG. 7 are perspective views of an outer object mold in a mold close and a mold open position, respectively.
Figure 7:
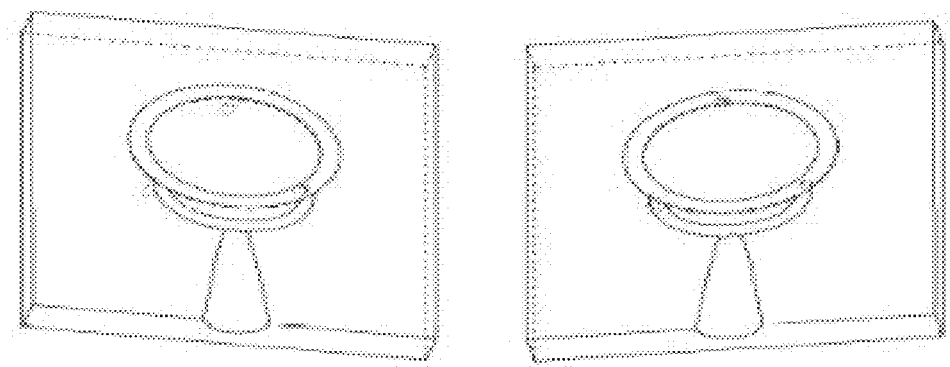
Figure 8:
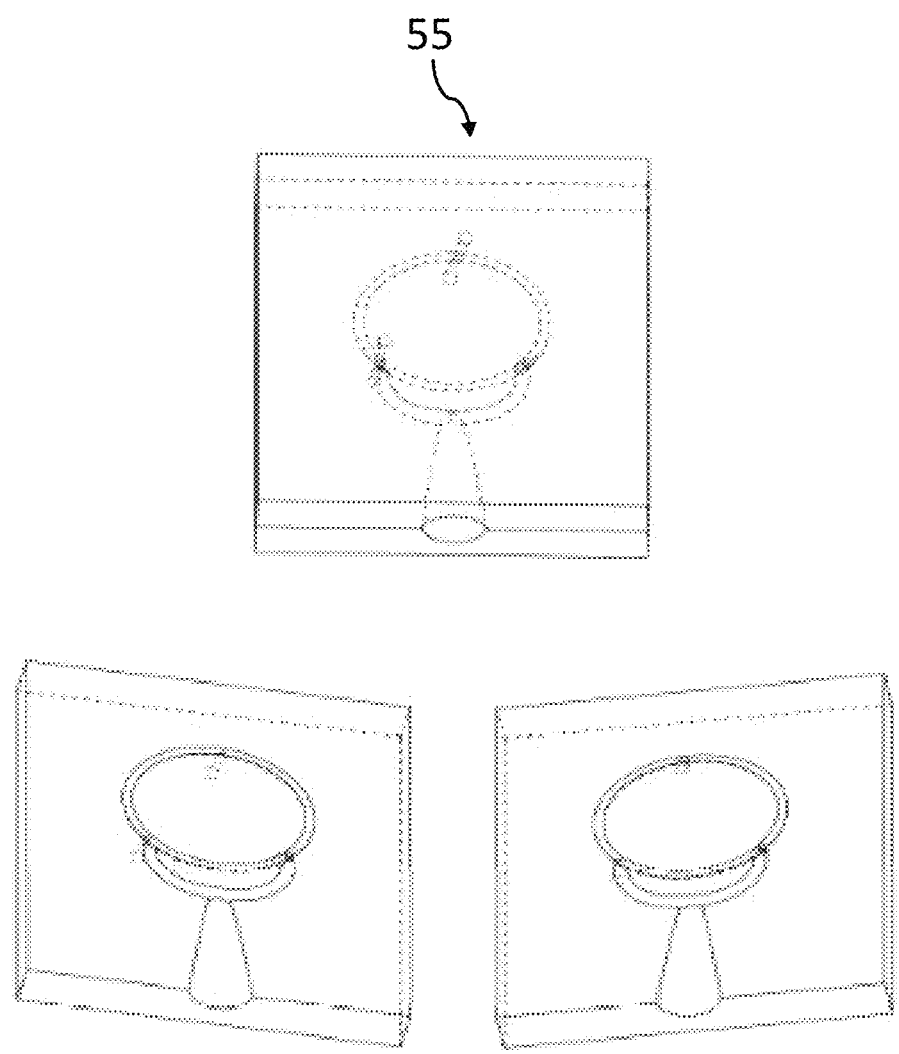
FIG. 8 are perspective views of an inner object mold in a mold close and a mold open position, respectively.

FIG. 7,8, for producing the jewelry article (100), an outer object mold (15) and an inner object mold (55) is prepared, using the outer master (14) and the inner master (54) respectively, as a pattern. These molds are made of a material depending on production quantity of the jewelry article (100). For the present embodiment the outer object mold and inner object mold is considered to be made of synthetic rubber of durometer hardness 40 to 70. However, such molds are made also in metal of different mechanical properties.

Figure 9:
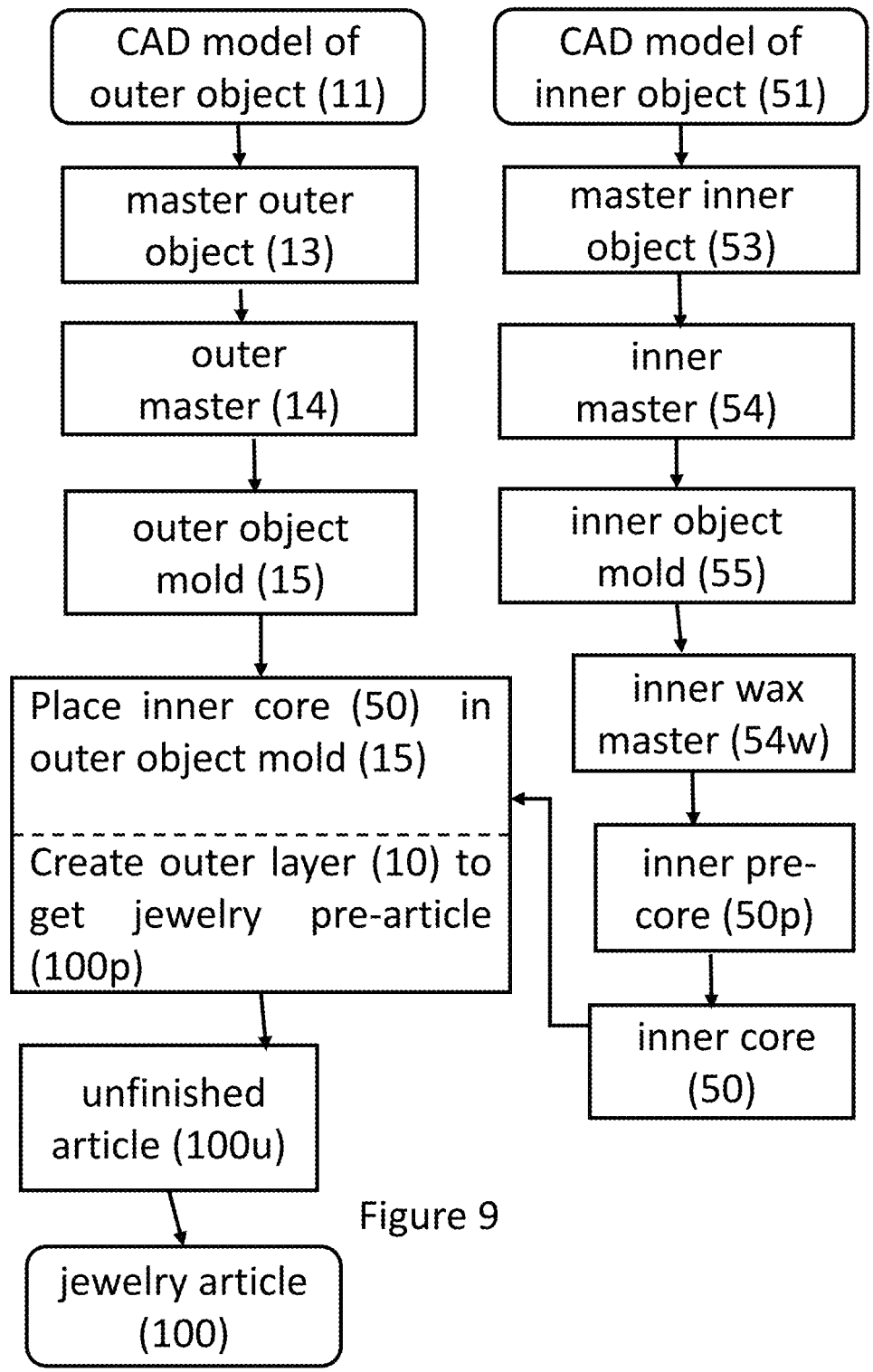
FIG. 9 is a flow diagram of process of producing jewelry as per present invention.

FIG. 9, to produce the jewelry article (100), an inner wax master (54w) is made by filling in wax in the inner object mold (55). The inner wax master (54w) is then converted into an inner pre-core (50p) by the casting process. A runner (30) of the inner pre-core (54p) is then trimmed and an inner core (50) thus obtained is then placed in the outer object mold (15), such that the plurality of inner markers (52a, 52b and 52c) occupy the synchronous marker position created in the outer object mold (15) by the outer markers (12a, 12b and 12c) of the outer master (14). The outer object mold (15) is then filled with wax to obtain a jewelry pre-article (100p). The jewelry pre-article (100p) is then converted into an unfinished article (100u) wherein the outer wax is replaced by precious metal using the casting process, so as to form the outer layer (10). Such unfinished article (100u) has a runner (30) made of precious metal, which is removed. A plurality of inner markers (52a, 52b, 52c) made of non-precious metal and still projecting out are removed to obtain the jewelry article (100) as per present invention. Consequent to the synchronous position, the outer layer (10) engulfs the inner core (50) with a prescribed thickness dimension (44) all around.

Figure 10:
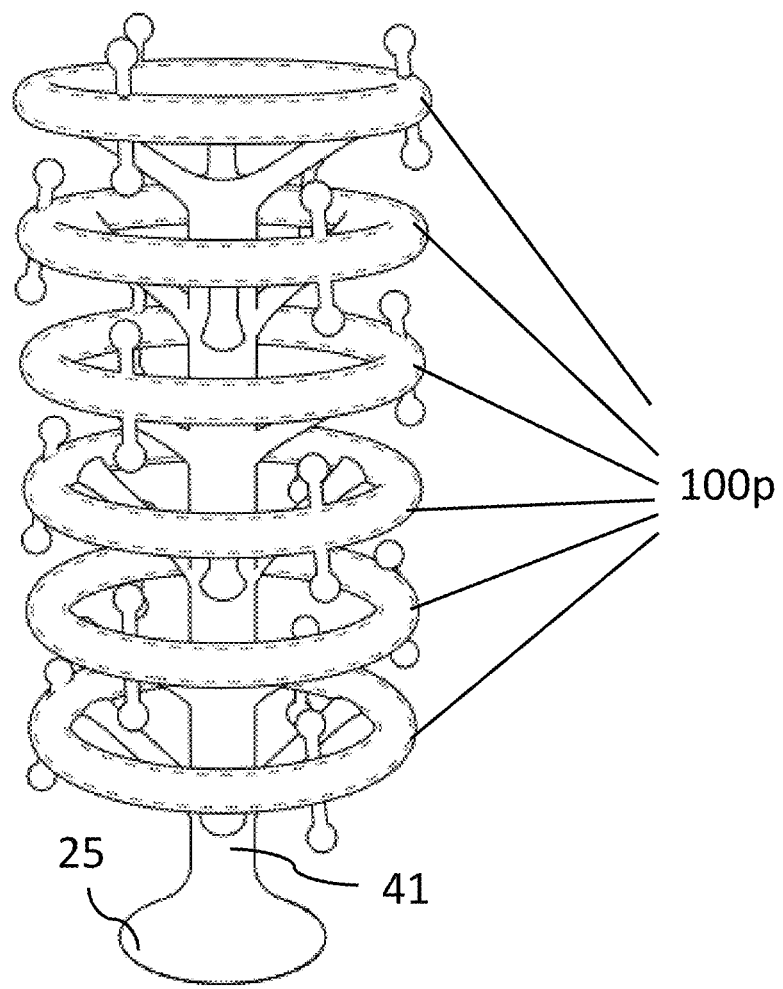
FIG. 10 is a perspective view of a plurality of jewelry pre-article grouped together for bulk production.
Figure 12:
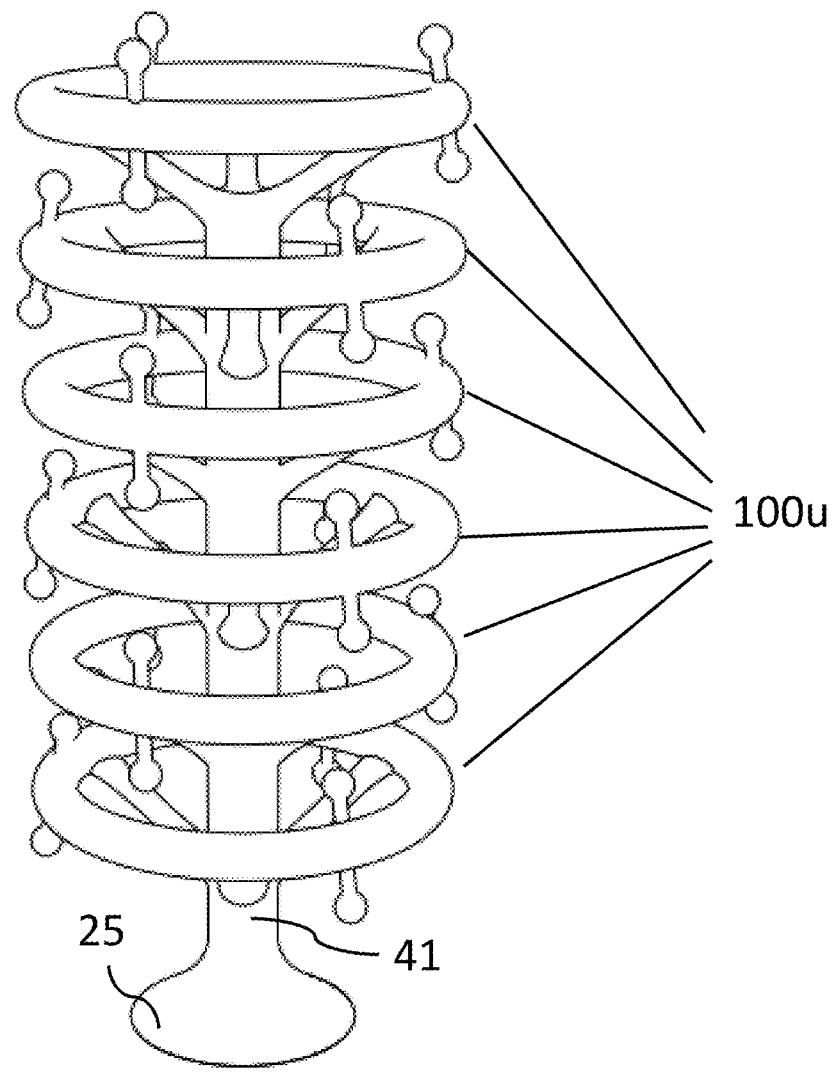
FIG. 12 is a perspective view of a plurality of unfinished article produced in bulk.

FIG. 10, for producing the jewelry article (100) in bulk, a plurality of jewelry pre-article (100p) are grouped together around a pillar (41) which is erected in a rigid base (25), so as to obtain unfinished article (100u) in bulk, as shown in FIG. 12.

Figure 13:
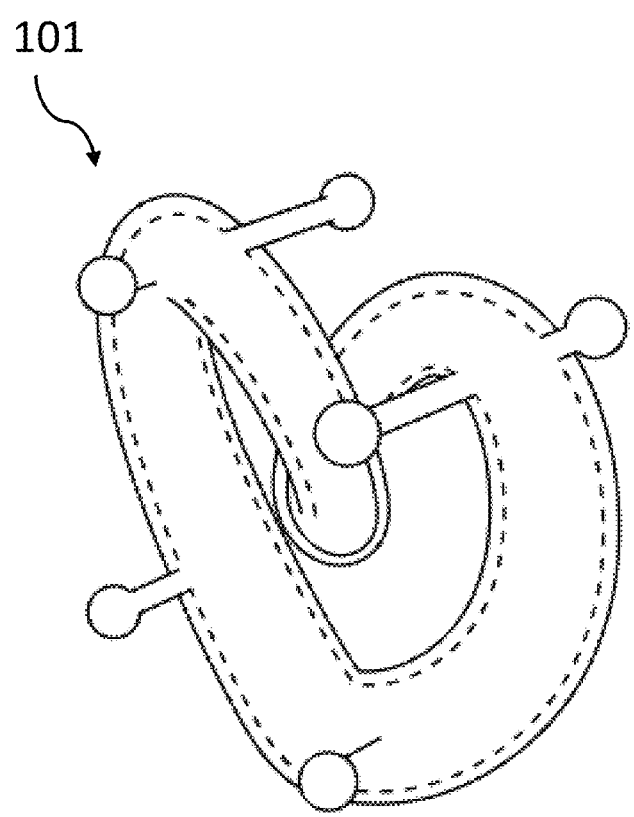
FIG. 13, 14, 15 are perspective views of jewelry articles of non-symmetrical shapes and contours, open ends and of any complex shape and contour producible by the present invention.
Figure 14:
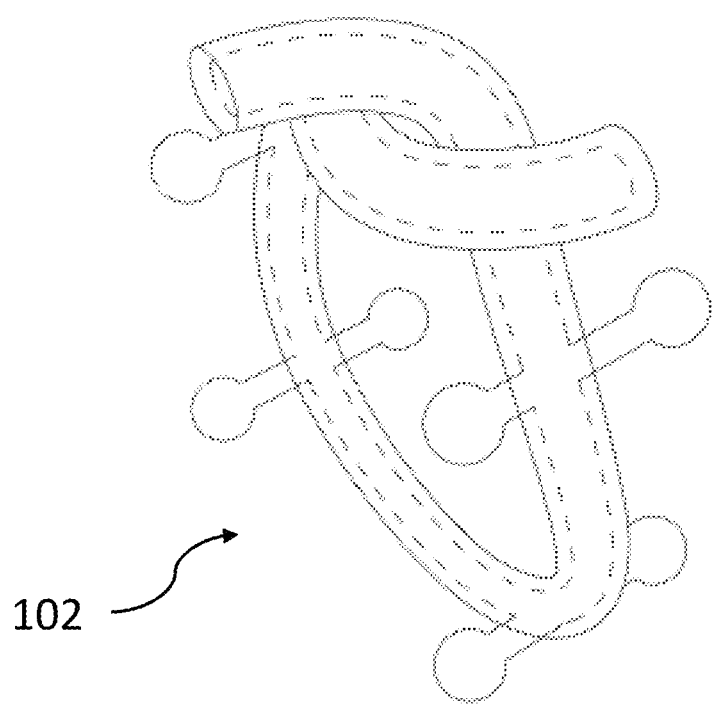
Figure 15:
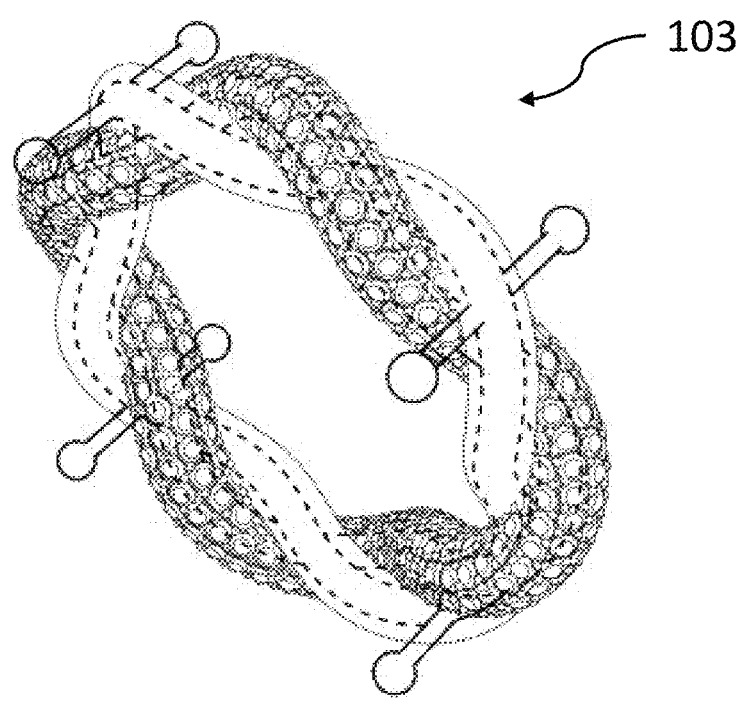

FIG. 13, 14, 15, jewelry articles of non-symmetrical shapes and contours (101), open ends (102) and of any complex shape and contour (103) are producible by the present invention with equal ease.

Jewelry articles producible by the present inventive process can be studded with diamonds and precious stones, by pushing them in wax/equivalent material of the jewelry pre-article (100p).

Figure 16:
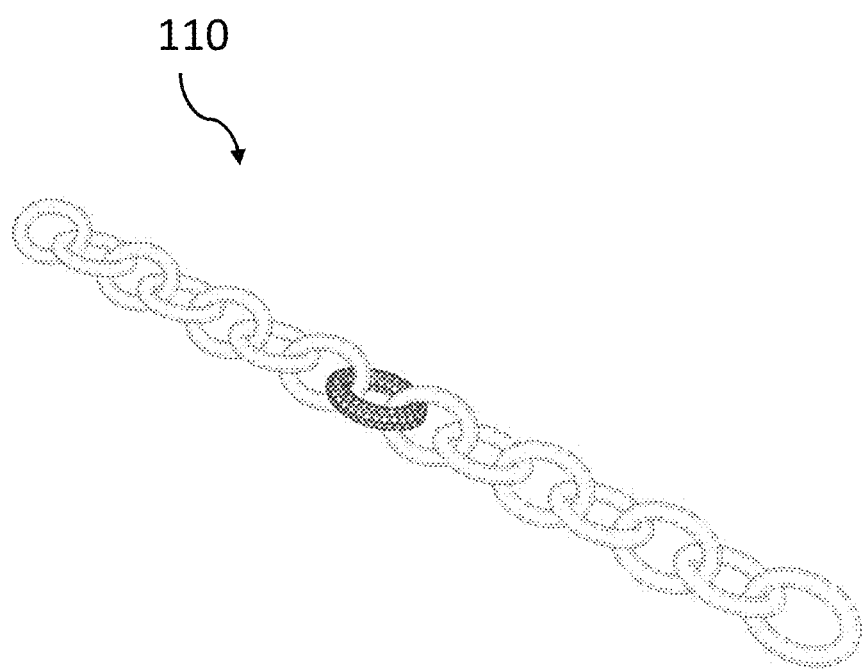
FIGS. 16 and 17 are perspective views of an array of links producible by the present invention.
Figure 17:
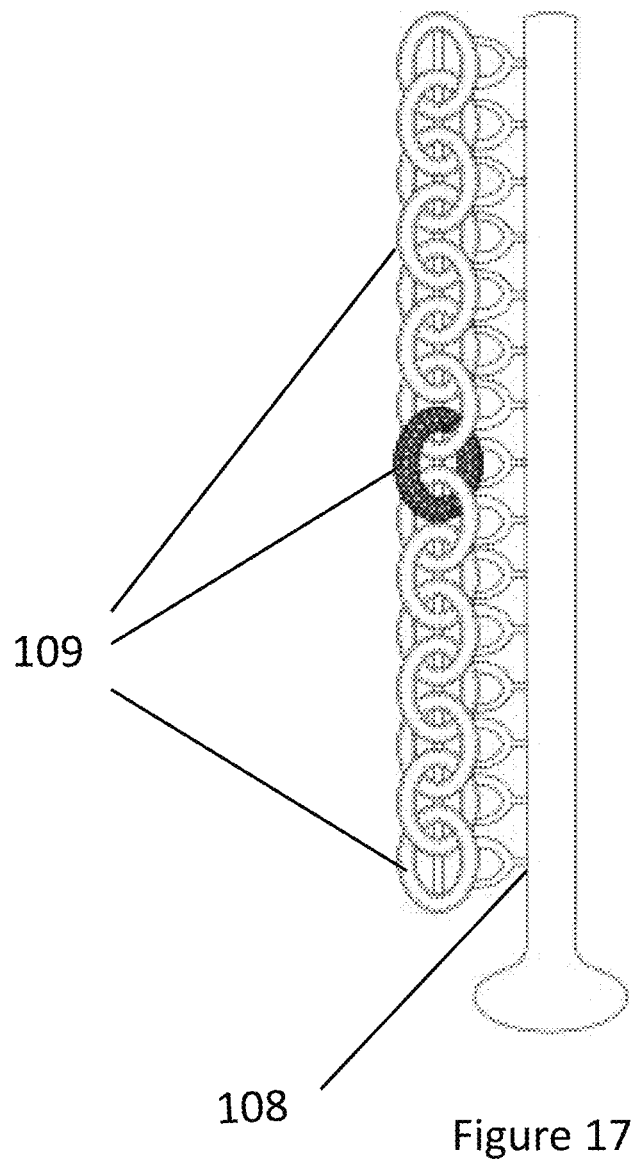

FIG. 16, 17, an array of links (110) can be made using any shape of closed links. Each link (109) is held by a separate support (108) during the casting process.

Importantly, mechanically moving, flexing and load bearing part of an active jewelry are optionally made of non-precious metal as per present invention, giving a longer durability to such jewelry. The term "active jewelry" signifies that such jewelry has movable and or flexing parts which encounter varying mechanical parameters while in use.

Figure 18:
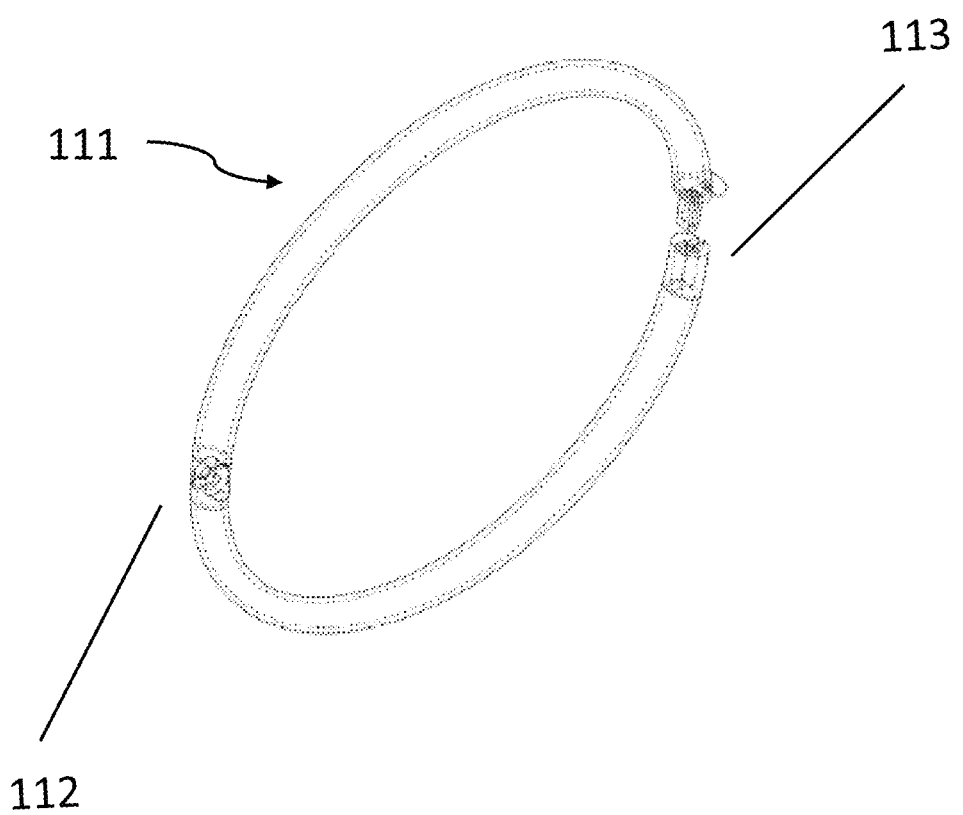
FIGS. 18 and 19 are a perspective and a front view of an active jewelry.
Figure 19:
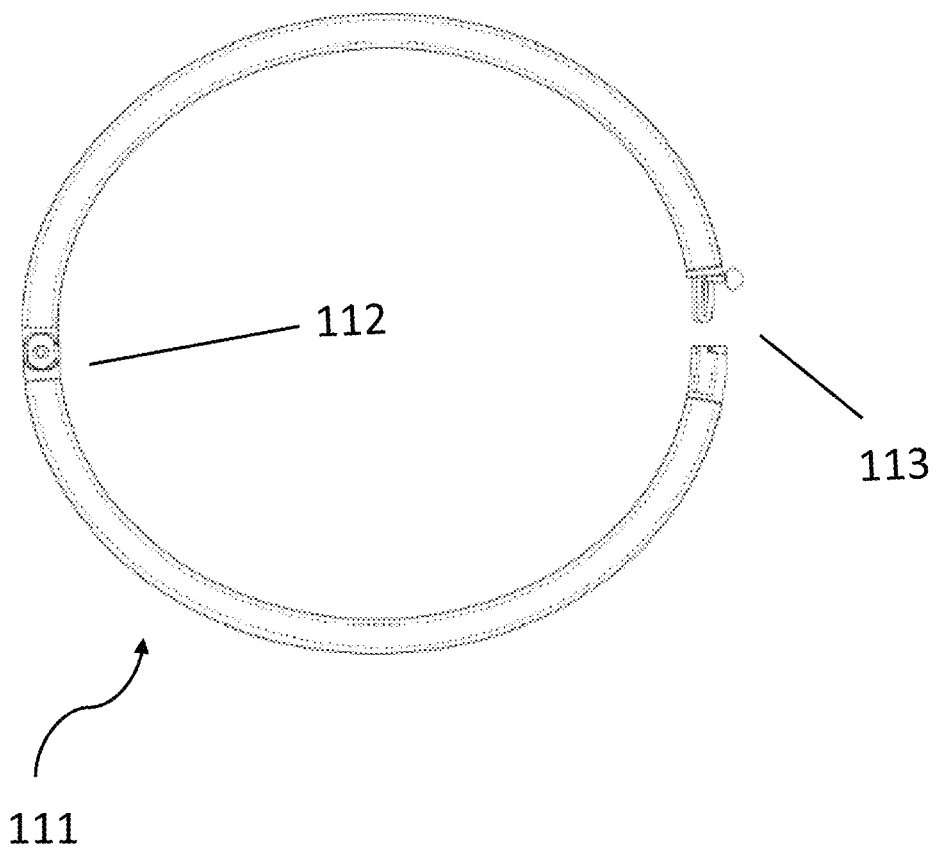

FIG. 18, 19, a bracelet (111) made as per present invention has a hinge (112) and a locking clasp (113) integrally made of the non-precious metal of the inner core.

Figure 11:
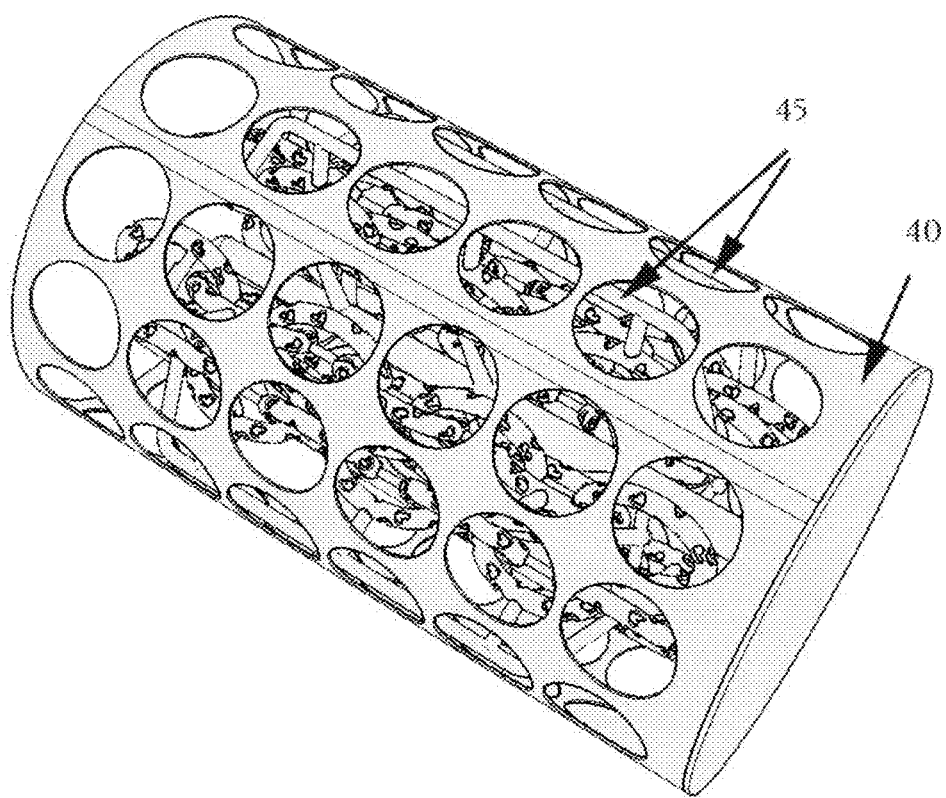
FIG. 11 is a perspective view of a casting flask.

A preferred embodiment of the casting process referred to above is as follows: FIG. 11 shows a wax formation of the jewelry or object to be cased is installed in a casting flask (40) of metal with big holes (45) all around. The holes (45) are initially temporarily closed by wrapping a thin plastic film coated with adhesive to keep the plastic film in its place. The casting flask (40) is filled with gypsum plaster, also known as plaster of Paris, lime plaster, or cement plaster or equivalent material which has refractory properties i.e. it should be able to withstand up to 1000° C. temperature without scorching or burning away and should not produce fumes when heated. The refractory material is filled in low viscosity form by making its dilute solution in water. After the refractory material solidifies, the casting flask (40) is heated so as to melt away the wax or the equivalent material used for making solid model. Precious metal in the molten form is poured in the casting flask (40) and plurality of jewelry is obtained, with diamonds and precious stones studded robustly.

Process Variations and Alternatives:

Use of CNC machining to produce models of wax, brass, bronze or silver.

Use of resins(s) instead of wax as a 3D print material

The invention claimed is:

1. A process to produce a jewelry article (100) comprising an outer layer (10) and an inner core (50) wherein a melting temperature of the inner core (50) is higher than that of the outer layer (10), the process comprising the steps of:
   developing a computer aided design (CAD) model of an outer object (11) having a plurality of outer markers (12a, 12b and 12c) and dimensionally corresponding to the outer layer (10),
   developing a computer aided design (CAD) model of an inner object (51) having a plurality of inner markers (52a, 52b and 52c) and dimensionally corresponding to the inner core (50),
   ensuring that each inner markers (52a, 52b, 52c) is identical in dimension and orientation to corresponding outer markers (12a, 12b, 12c) respectively, the inner markers (52a, 52b, 52c) are located on the inner object (51) such that the outer markers (12a, 12b, 12c) as well as the inner markers (52a, 52b, 52c) are identically located with respect to a common reference coordinate (40),
   producing a master outer object (13) and a master inner object (53) in wax by 3D printing, producing the master outer object (13) and the master inner object (53) in a metal by a casting process, attaching a runner (30) to the master outer object (13) and the master inner object (53) to obtain an outer master (14) and an inner master (54) respectively, producing an outer object mold (15) and an inner object mold (55) using the outer master (14) and the inner master (54) respectively, as a pattern, producing an inner wax master (54w) by filling in wax in the inner object mold (55), producing an inner pre-core (50p) from the inner wax master (54w) by the casting process, trimming a runner (30) of the inner pre-core (54p) to obtain the inner core (50), placing the inner core (50) in the outer object mold (15), such that the plurality of inner markers (52a, 52b and 52c) occupy a synchronous marker position created in the outer object mold (15) by the outer markers (12a, 12b and 12c) of the outer master (14), filling the outer object mold (15) with wax to obtain a jewelry pre-article (100p), producing an unfinished article (100u) from the jewelry pre-article (100p) wherein outer wax is replaced by precious metal using the casting process, removing from the unfinished article (100u) a runner (30) made of precious metal and the plurality of inner markers (52a, 52b, 52c), and touching up the unfinished article (100u) with the precious metal to obtain the jewelry article (100).

2. The process to produce the jewelry article (100) as claimed in claim 1, wherein the outer object mold (15) and the inner object mold (55) are made of synthetic rubber of durometer hardness 30 to 70.

3. The process to produce the jewelry article (100) as claimed in claim 1, wherein a plurality of jewelry pre-article (100p) are grouped together around a pillar (41) erected on a base (25) for producing the jewelry article (100) in bulk.

4. The process to produce the jewelry article (100) as claimed in claim 1, wherein the jewelry article (100) is studded with precious stones, by pushing the precious stones in the jewelry pre-article (100p).

5. The process to produce the jewelry article (100) as claimed in claim 1, wherein the casting process comprises the steps of:

installing a wax formation of the jewelry pre-article or the master inner or outer object in a casting flask (40) of metal with holes (45) all around, the holes (45) initially temporarily closed by wrapping a plastic film coated with adhesive;

filling the casting flask (40) with a refractory material;

heating the casting flask (40) after the refractory material solidifies, melting away the wax material used for the jewelry pre-article or the master inner or outer object; and pouring metal in the molten form in the casting flask(40).

6. The process to produce the jewelry article (100) as claimed in claim 1, wherein the outer layer (10) is made of a precious metal; while the inner core (50) is made of a non-precious metal.

7. The process to produce the jewelry article (100) as claimed in claim 1, wherein the jewelry article (100) is an array of closed links (110).

8. The process to produce the jewelry article (100) as claimed in claim 1, wherein a prescribed thickness dimension (44) all around is non-uniform.

9. The process to produce the jewelry article (100) as claimed in claim 1, wherein the prescribed thickness dimension (44) all around is uniform.

10. The process to produce the jewelry article (100) as claimed in claim 1, wherein the inner core (50) integrally comprises mechanically moving, flexing and load bearing part of an active jewelry.

11. The process to produce the jewelry article (100) as claimed in claim 1, wherein the jewelry article (100) is of a non-symmetrical shape (101) and contour, with open ends (102) or without ends (103).

* * * * *